Dec. 5, 1961  G. L. BRIDGER  3,011,888
METHOD OF PRODUCING DICALCIUM PHOSPHATE
CONTAINING FERTILIZERS
Filed Oct. 8, 1959  2 Sheets-Sheet 2
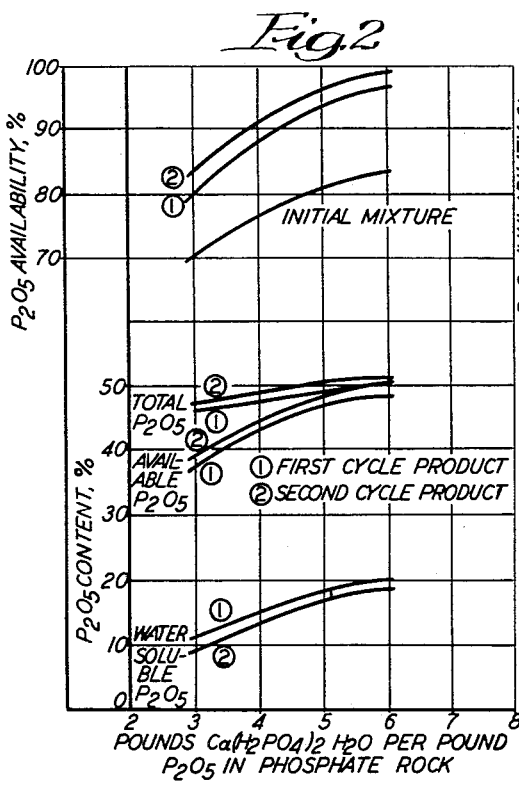
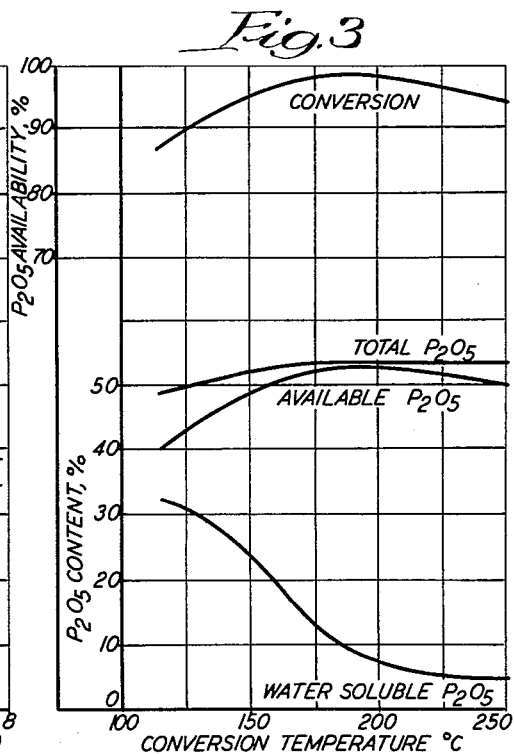
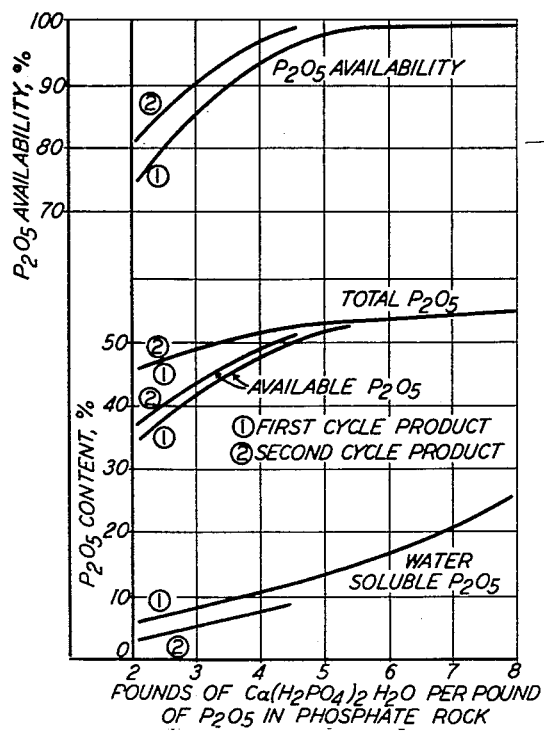
INVENTOR:
Grover L. Bridger,
BY
Dawson, Tilton & Graham,
ATTORNEYS.

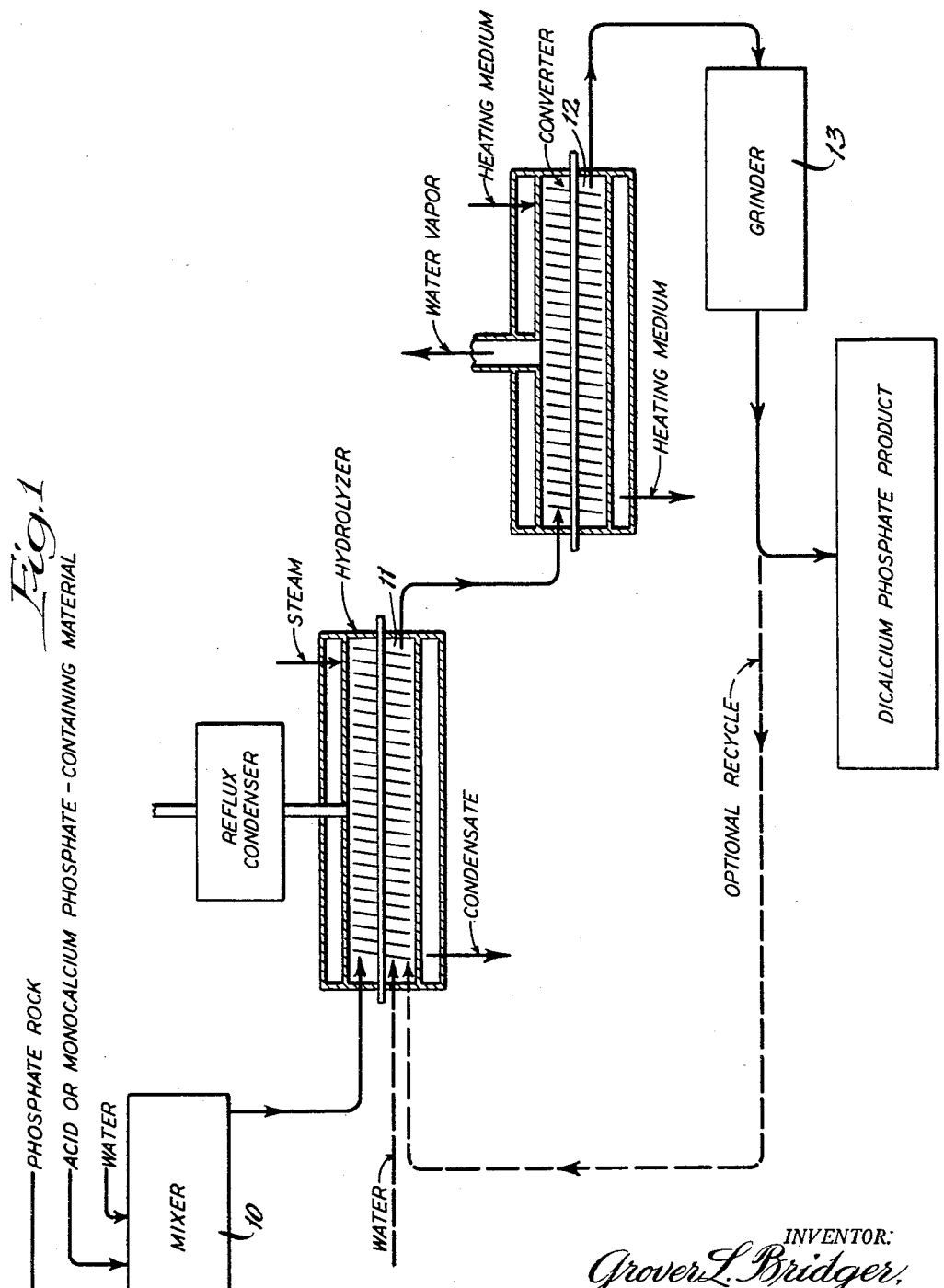

United States Patent Office 3,011,888
Patented Dec. 5, 1961

3,011,888
METHOD OF PRODUCING DICALCIUM PHOSPHATE CONTAINING FERTILIZERS
Grover L. Bridger, Baltimore, Md., assignor to Iowa State College Research Foundation, Ames, Iowa, a corporation of Iowa
Filed Oct. 8, 1959, Ser. No. 845,284
6 Claims. (Cl. 71—37)

This invention relates to a method of producing dicalcium phosphate-containing fertilizers, and more particularly to a method of producing such fertilizers from a phosphate rock or a monocalcium phosphate starting material. The method is particularly adapted to the production of mixed fertilizers containing a major proportion of dicalcium phosphate and a minor proportion by weight of monocalcium phosphate. In practicing the method to produce such fertilizers, substantially less acid is required to produce a unit of available $P_2O_5$ than is required by present commercial processes for preparing a phosphate fertilizer from phosphate rock.

This application is a continuation-in-part of my copending application Serial No. 530,053, filed August 23, 1955, now abandoned.

An object of this invention is to provide a practical and efficient method for producing a dicalcium phosphate-containing fertilizer using as the sole reactants introduced into the process either phosphate rock and a mineral acid or phosphate rock and monocalcium phosphate. Another object is to provide a method of producing a product containing a major proportion of dicalcium phosphate and a minor proportion of monocalcium phosphate and having over 90% of the $P_2O_5$ therein in an available form. Further objects and advantages will be indicated in the following detailed specification.

The present invention is illustrated in a preferred embodiment in FIG. 1 of the accompanying drawing, which shows a diagrammatic flow sheet for my process as it would preferably be carried out on a continuous basis. FIGS. 2 and 3 are graphs which facilitate the understanding of the invention with particular reference to Examples II and III herein.

The method of this invention is characterized by a procedure wherein a monocalcium phosphate-containing starting material is contacted with water to form a solution or a slurry wherein at least part of the monocalcium phosphate is in solution. This reaction mixture containing the dissolved monocalcium phosphate is then heated to hydrolyze the dissolved monocalcium phosphate to dicalcium phosphate with the liberation of phosphoric acid. The liberated phosphoric acid dissolves in the water provided by the reaction mixture to form an aqueous solution of phosphoric acid. The dicalcium phosphate as formed precipitates as a solid phase. Thus, the reaction mixture at the conclusion of the hydrolysis step will contain portions of aqueous phosphoric acid and solid dicalcium phosphate which have been formed from the monocalcium phosphate starting material. The reaction mixture at this point will also contain some unhydrolyzed monocalcium phosphate, either in solution, or in the solid phase, or both. In a preferred embodiment of the process, as will subsequently be described in detail, the reaction mixture on the conclusion of the hydrolysis step, and in fact throughout the hydrolysis step, will contain a substantial amount of unreacted phosphate rock.

The final step of the process which characterizes the method of the present invention when used in combination with the hydrolyzing step previously described involves heating the reaction products of the hydrolyzing step (the dicalcium phosphate and aqueous phosphoric acid) in contact with unreacted phosphate rock under atmospheric pressure and at a temperature of at least 130° C. to evaporate the water and force the phosphoric acid to combine with the phosphate rock to produce monocalcium phosphate. Preferably, the evaporation is continued until a dry solid product is obtained comprising a mixture of dicalcium phosphate and monocalcium phosphate. In the preferred embodiment of the present invention, the product contains a major proportion of dicalcium phosphate in admixture with a minor proportion of monocalcium phosphate.

In practicing the method of this invention in one of its embodiments, as a preliminary step finely-divided phosphate rock is acidulated in the usual way, except that the amount of acid employed is substantially less than the amount theoretically required to completely convert the $P_2O_5$ content of the rock to monocalcium phosphate. As is well known in the art, various mineral acids can be employed for the acidulation, such as phosphoric acid, sulfuric acid, nitric acid and phosphoric acid is preferred. The formation of monocalcium phosphate from phosphate rock is an exothermic reaction which proceeds rapidly as the acid and rock are mixed together. If desired, the acidulated rock can be stored to increase conversion of the rock to monocalcium phosphate, in accordance with practices well known in the art. Storage is not essential to the present invention, and may be dispensed with entirely. The result of acidulating the phosphate rock with a deficiency of acid is to produce a material containing monocalcium phosphate and unreacted phosphate rock. This material is then further processed as follows.

In the second step of my process for this particular embodiment, the material obtained by acidulating the phosphate rock with a deficiency of acid is treated to hydrolyze the monocalcium phosphate in the material to form dicalcium phosphate and phosphoric acid. This can be done by heating the material in the presence of water at a temperature promoting the hydrolysis. Temperatures as low as 50° C. can be used, but I prefer temperatures of around 100° C. up to 120° C. When sufficient water is present to form a slurry, as preferred, such temperatures approach the boiling temperatures of the liquid portion of the slurry, and would lead to the evaporation of water from the slurry. However, I prefer to carry out the hydrolysis in such a way that sufficient water is maintained in the mixture or slurry to form an aqueous solution of monocalcium phosphate. The result of the hydrolysis step is to produce a material, which may be in the form of a slurry, containing dicalcium phosphate, phosphoric acid, water, monocalcium phosphate, and unreacted phosphate rock.

As a third step, the phosphoric acid-containing material just described is further treated to convert a substantial portion of the unreacted phosphate rock therein to an available phosphate. This can be done by heating the material to a temperature of at least 125° C. and preferably over 130° C. under substantially atmospheric pressure while decreasing the water content thereof. Preferably, the heating is continued until substantially all of the free water is removed. In this way, the phosphoric acid in the material is forced to react with the unreacted phosphate rock therein. This yields a product having increased $P_2O_5$ availability as compared with the first material obtained in the acidulation step, although no additional acid beyond that originally employed has been added during the subsequent processing steps. The net result is that a product of high phosphate availability can be obtained with a greatly decreased amount of acid.

When the conversion has not been as complete as would be desired, additional water can be added to the product and the hydrolysis and conversion steps repeated as often as necessary.

The theoretical basis for the above-described process is believed to be as follows. During the preliminary mixing step, part of the phosphate rock is reacted with the acid to form monocalcium phosphate, but since there is a deficiency of acid, the remainder of the rock is unattacked. During the hydrolysis step, the following reaction takes place.

$$Ca(H_2PO_4)_2 \cdot H_2O + xH_2O = CaHPO_4 + H_3PO_4 + (x+1)H_2O$$

It has long been known that this reaction will take place and that the extent of the formation of dicalcium phosphate and phosphoric acid depends on the temperature and the water content of the system. For example, K. L. Elmore and T. D. Farr, Industrial and Engineering Chemistry, vol. 32, page 580 (1940), reported that a mixture of monocalcium phosphate monohydrate and water containing 26% free water would be converted to dicalcium phosphate and phosphoric acid to the extent of 79% at 100° C. under equilibrium conditions. However, it has been previously thought not possible to utilize this reaction for the further conversion of the unattached portion of the phosphate rock into monocalcium and dicalcium phosphate. Previous workers have not been able to discover practical conditions under which such conversion takes place. In the present process, however, it has been found possible to integrate this hydrolysis reaction into a highly advantageous process.

In the third step, the mixture after hydrolysis, which contains unreacted rock phosphate, water, phosphoric acid, dicalcium phosphate, and monocalcium phosphate is heated to at least 125° C. with removal of water by evaporation and held above this temperature for an appropriate time. Under these conditions, the phosphoric acid liberated in the hydrolysis step is concentrated and is forced to react with the remaining phosphate rock. The net result is that a large proportion of the phosphate rock is converted to dicalcium phosphate and monocalcium phosphate. By repetitive cycles, the product, after grinding and addition of water, can be made to undergo further hydrolysis of its monocalcium content and, in turn, further conversion can be made to take place, so that by repetitive treatments essentially all of the phosphate rock may be converted to an available form. It is not economical, however, to repeat the cycle a sufficient number of times to achieve complete conversion to dicalcium phosphate, and the final product in an economical process will therefore contain both dicalcium and monocalcium phosphate. In the results so far achieved, it has been possible to convert 95 to 98% of the $P_2O_5$ in phosphate rock to available $P_2O_5$ by the use of about one-half of the proportion of phosphoric acid (or the equivalent amount of monocalcium phosphate) used in conventional processes. However, the phosphoric acid requirement can theoretically be reduced to one-fourth of that needed for monocalcium phosphate formation, and further improvements in procedures and operating techniques will doubtless approach this theoretical limit more closely. A product containing both mono- and dicalcium phosphate may be desired. Monocalcium phosphate is water-soluble and therefore rapidly available, while dicalcium is more slowly available. Some plants do best on such a mixture. It is contemplated that the preferred product will contain a major proportion by weight of dicalcium phosphate and a minor proportion of monocalcium phosphate with over 90% of the $P_2O_5$ therein in an available form.

During the hydrolysis step, it is desirable to use the minimum amount of water in the system consistent with good conversion. It has been found that best results are obtained when there is sufficient water present to form a slurry which can be easily agitated at the hydrolysis temperature. If less water than this is used, the hydrolysis reaction does not go as completely and if more water than this is used, the effect on the hydrolysis reaction is not great but the expense of removing the water in the conversion step is increase. The water should be sufficient to dissolve at least a portion of the monocalcium phosphate at the start of the reaction, and also to dissolve the phosphoric acid as it is formed in the hydrolysis. It has been found that the optimum proportion of free water is about 10 to 15% when phosphoric acid, monocalcium phosphate, or concentrated superphosphate is used, but as little as 5% and as much as 30% free water might be desirable under some conditions. Where the expense of removing the excess water is not objectionable the reaction mixture in the hydrolysis step may contain as much as 50% water. As is conventional, the foregoing percentages are on a weight basis, although a volume basis could also be used without affecting the results obtained. When sulfuric acid is used, slightly more water is needed, apparently due to hydration of the calcium sulfate (dihydrate) formed. A still larger amount of water is necessitated when nitric acid is used due to the fact that concentrated nitric acid will be partially decomposed during the mixing and a more dilute acid must be used to prevent this.

It is desirable but not necessary to carry out the hydrolysis around the boiling point of the slurry mixture (e.g. 100–120° C.) since hydrolysis increases with increasing temperature. Actual boiling improves agitation of the mixture. It is also possible to carry out the hydrolysis at somewhat lower temperatures (about 80° C.) without seriously affecting the final conversion. It is preferred to carry out the hydrolysis at a temperature of from 80–120° C. If lower conversions can be accepted, temperatures down to 50° C. can be used. The time necessary for hydrolysis is not critical and may vary somewhat depending on the scale of operation, the hydrolysis temperature, and the particular apparatus used. Generally, hydrolysis periods of from 15 minutes to 2 hours give good results.

It has been found that a temperature in the conversion step of about 125–130° C. is sufficient for appreciable conversion but temperatures above 130° C. are preferred. Temperatures of from 150 to 260° C. can be used but a temperature of around 185° C. appears to be sufficient for maximum conversion. Preferably the temperature is kept below 200° C. for maximum conversion.

Agitation and grinding during the hydrolysis and/or conversion steps are desirable but not necessary. However, if agitation and grinding are carried out a greater percentage of conversion will probably be achieved in a single cycle than otherwise.

In an alternative embodiment of this invention, the hydrolysis and conversions steps as described above are practiced independently of the special mixing step in which a deficiency of acid is used. A material suitable for the hydrolysis step in combination with the conversion step can be formed by mixing phosphate rock (unreacted) with monocalcium phosphate and water. The monocalcium phosphate can be provided by any of the standard fertilizer materials, such as normal superphosphate or triple superphosphate. The latter is particularly desirable because of its high content of monocalcium phosphate monohydrate (80 to 86%). In preparing such a mixture, it is desirable to use sufficient phosphate rock to react with all of the phosphoric acid which will be liberated in the hydrolysis step. On the other hand, a large excess of unreacted phosphate rock is of no particular advantage. The amount of water can be regulated in accordance with the considerations set out above. The mixture is then subjected to one or more cycles of the hydrolysis and conversion steps which have already been described. The same procedures and conditions have been found to apply.

As a further alternative embodiment, a monocalcium phosphate-source material can be mixed with water and subjected to hydrolysis in the manner previously described. To the resulting material can then be added an appropriate amount of unreacted phosphate rock prior to the conversion step. This procedure, however, is not as desirable as having the unreacted rock present during the hydrolysis step, since it is believed that some of the phosphate rock may be converted during the hydrolysis step, thus facilitating the later conversion step.

One advantage of the procedures in which the unreacted phosphate rock is not present until a later step in the process is that the amount of grinding and agitation can be reduced in the hydrolysis and conversion steps. With a deficiency of acid in the mixing step, monocalcium phosphate layers may be formed around nuclei of unreacted phosphate rock. These layers would be changed to less soluble dicalcium phosphate in the hydrolysis step and would then have to be removed to expose the phosphate rock for further reaction with acid in the conversion step. This might be particularly troublesome when sulfuric acid is used for the acidulation, since the protecting layers might also contain insoluble calcium sulfate. As already indicated, however, if desired, grinding of the material can be carried out simultaneously with the hydrolysis and conversion steps, which will largely avoid this problem.

This invention is further illustrated by the following specific examples which comprise a laboratory verification on a batch basis of the process conditions and procedures described above.

Example I

A mixture containing 50 grams of Florida phosphate rock, 88.5 grams of monocalcium phosphate monohydrate, and 16.8 grams of water was made in a glass flask. The phosphate rock contained 33.8% $P_2O_5$ and had been ground so that it all passed a 60 mesh screen, 89% passed a 100 mesh screen, and 55% passed a 200 mesh screen. The mixture contained 10.8% free water on the wet basis. The mixture was a thick plastic mass and had the consistency of a stiff mud at room temperature.

The mixture was heated to its boiling point by means of an oil bath in which the flask was partially immersed. Provision was made for reflux and agitation of the mixture. A period of 20 minutes was required to reach boiling and heating was continued at this temperature for 15 minutes. The mixture was a thin slurry at the boiling temperature, which was about 110° C. The reflux condenser was then removed and the temperature of the mixture was raised to 130° C., which required 20 minutes, and heating was continued at this temperature for 30 minutes. The product was quite dry and was ground in a laboratory mill so that all of it passed a 48 mesh screen. It was then placed back in the hydrolysis flask, 25 grams of water was added, which was the weight loss of the mixture in the foregoing steps, and the hydrolysis and conversion steps repeated as above.

The chemical analysis of the initial mixture of monocalcium phosphate monohydrate and phosphate rock (before addition of water) and of the products after the first and second cycles are as follows:

|  | Initial mixture, percent | Product | |
|---|---|---|---|
|  |  | 1st cycle, percent | 2nd cycle, percent |
| Total $P_2O_5$ | 47.9 | 50.0 | 50.6 |
| Citrate insoluble $P_2O_5$ | 8.7 | 2.7 | 1.4 |
| Available $P_2O_5$ | 39.2 | 47.3 | 49.2 |
| Water soluble $P_2O_5$ | 31.8 | 17.9 | 17.2 |
| Availability | 82.0 | 94.5 | 97.2 |

The availability figure is the percentage of the total $P_2O_5$ which is in an available form.

It can be seen that most of the $P_2O_5$ in the phosphate rock has been converted into an available form and even more of it could be converted by further cycles of hydrolysis and conversion, but further processing in this case does not appear to be economical. It is also seen that the water-soluble $P_2O_5$ has decreased considerably, indicating formation of dicalcium phosphate which is water-insoluble.

The $P_2O_5$ content of monocalcium phosphate can be considered to be derived from phosphate rock and phosphoric acid in the proportions of ⅓ from rock and ⅔ from acid. On this basis it can be calculated that in the mixture used for this example approximately equal proportions of the $P_2O_5$ was derived from phosphate rock and from phosphoric acid. The equivalent proportion of phosphoric acid and rock phosphate $P_2O_5$ is 1.39 lbs. of 100% $H_3PO_4$ per pound of rock phosphate $P_2O_5$. Since 3.2 lbs. of 100% $H_3PO_4$ per pound of rock phosphate $P_2O_5$ is used in concentrated superphosphate manufacture, the above product was made with an equivalent acidulation of only 43% of that used for concentrated superphosphate manufacture.

Similar experiments were carried out in which different proportions of monocalcium phosphate monohydrate and phosphate rock were used. The results are shown graphically in FIG. 2.

X-ray analysis of product samples produced as described in this example, showed that the product consists of a mixture of anhydrous dicalcium phosphate ($CaHPO_4$) and residual unreacted phosphate rock and monocalcium phosphate monohydrate $$[Ca(H_2PO_4)_2 \cdot H_2O]$$

Similar products made from commercial triple superphosphate or normal superphosphate, as described in subsequent examples, also contained some anhydrous and a little partially hydrated calcium sulfate ($CaSO_4$ or $CaSO_4 \cdot 1\frac{1}{2}H_2O$).

Example II

A series of experiments was made in which the temperature of the conversion step was varied. In each experiment, a mixture containing 50 grams of the Florida phosphate rock used in Example I, 88.5 grams of monocalcium phosphate monohydrate, and 23 grams of water was heated to its boiling point and maintained at this temperature under reflux and with agitation for 15 minutes. The reflux condenser was then removed and the open flask containing the mixture was placed in an oil bath at the desired conversion temperature, it was held at this temperature for 30 minutes. The time required to reach the desired temperature was variable, a greater time being required the higher the desired conversion temperature. As an example, about 1½ hours was required for the mixture to reach 185° C., which resulted in a total heating time in the conversion step of two hours. It was observed that the conversion reaction was appreciably exothermic, and that toward the end of the heating period it was necessary to reduce the heat input to maintain a constant temperature.

The results of the experiments are shown in the following table:

| Conversion temp., ° C. | Percent $P_2O_5$ | | | | |
|---|---|---|---|---|---|
|  | Total | Citrate insol. | Avail. | Water sol. | Availability |
| Initial mixture | 47.9 | 8.7 | 39.2 | 31.8 | 82.0 |
| 115 | 48.0 | 5.9 | 42.1 | 30.8 | 88.0 |
| 125 | 50.4 | 4.6 | 45.8 | 30.7 | 91.0 |
| 135 | 49.3 | 4.6 | 44.7 | 26.5 | 90.6 |
| 145 | 51.0 | 3.5 | 37.5 | 25.1 | 93.1 |
| 155 | 51.6 | 3.5 | 48.1 | 23.2 | 93.5 |
| 165 | 52.8 | 1.6 | 51.2 | 11.0 | 97.0 |
| 175 | 53.7 | 1.4 | 52.3 | 12.0 | 97.4 |
| 185 | 53.5 | 1.0 | 52.5 | 11.2 | 98.2 |
| 195 | 53.9 | 1.2 | 52.7 | 7.4 | 98.0 |
| 205 | 53.2 | 1.4 | 51.8 | 7.0 | 97.4 |
| 215 | 53.4 | 1.6 | 51.8 | 4.4 | 97.1 |
| 225 | 53.4 | 1.8 | 51.6 | 5.4 | 96.9 |
| 258 | 53.0 | 3.2 | 49.8 | 4.8 | 94.0 |

The results are also plotted in FIG. 3. It is seen that the maximum conversion was obtained at a temperature of 185° C. and that a conversion of 95% or higher was obtained over the temperature range of 155 to 240° C.

It should also be noted that the total $P_2O_5$ content continued to increase until a temperature of about 175° C. was reached, and thereafter, it remained constant. The available $P_2O_5$ content reached a maximum at about 185° C. The water-soluble $P_2O_5$ content decreased with increasing temperature but the rate of decrease was greatest in the temperature range where conversion was increasing; thereafter, it decreased more gradually.

*Example III*

Mixtures of monocalcium phosphate monohydrate and the phosphate rock described in Example I in varying proportions were made. Sufficient water was added to each mixture so that the percentage of free water (wet basis) in the mixture was 12 to 18%, the larger proportions of water being used with the smaller proportions of monocalcium phosphate. Each mixture was hydrolyzed at its boiling point under reflux for one hour and then heated without reflux to 185° C. and held at this temperature for 30 minutes. Some of the products were ground to pass a 60-mesh screen, water was added, and the hydrolysis and conversion steps repeated.

The results of the experiments are shown in the following table and also in FIG. 4.

| Weight ratio, $Ca(H_2PO_4).H_2O/P_2O_5$ | Cycle | Percent $P_2O_5$ in product | | | | |
|---|---|---|---|---|---|---|
| | | Total | Citrate insoluble | Available | Water soluble | Availability |
| 2.24 | 1 | 46.8 | 11.0 | 35.8 | 6.2 | 76.5 |
| | 2 | 46.5 | 8.8 | 37.7 | 3.5 | 81.1 |
| 2.81 | 1 | 46.8 | 7.0 | 39.8 | 8.3 | 85.0 |
| | 2 | 48.4 | 5.0 | 43.4 | 4.7 | 89.6 |
| 3.49 | 1 | 49.6 | 5.4 | 44.2 | 9.7 | 89.1 |
| | 2 | 49.7 | 3.2 | 46.5 | 5.9 | 93.1 |
| 4.29 | 1 | 51.8 | 2.9 | 48.9 | 11.9 | 94.3 |
| | 2 | 51.6 | 1.4 | 50.2 | 9.8 | 97.3 |
| 5.23 | 1 | 53.2 | 1.0 | 52.5 | 14.0 | 98.2 |
| 7.80 | 1 | 54.8 | 0.7 | 54.1 | 24.8 | 98.9 |

It is seen that the smaller the proportion of monocalcium phosphate used, the lower is the conversion to available $P_2O_5$. However, proportions of monocalcium phosphate giving products that might be considered too low in $P_2O_5$ availability after a single cycle can be improved to an acceptable extent by repeated cycles. It should be noted that products containing very little or a considerable proportion of its $P_2O_5$ in a water-soluble form may be made, depending on the proportion of monocalcium phosphate used. The optimum proportion of monocalcium phosphate and the optimum number of cycles is a matter of operating economics and would have to be chosen after a consideration of the particular conditions at hand.

*Example IV*

A mixture of 35.2 grams of the same phosphate rock used in Example I, 100 grams of a commercial concentrated superphosphate (containing 2.3% moisture) and 32.3 grams of water was made and subjected to 3 cycles of hydrolysis, conversion and grinding as in Example I. The compositions of the concentrated superphosphate, the initial mixture of concentrated superphosphate and phosphate rock (before addition of water), and the products from each of the 3 cycles are as follows:

| | Concentrated super phosphate, percent | Initial mixture, percent | Product | | |
|---|---|---|---|---|---|
| | | | 1st cycle, percent | 2nd cycle, percent | 3rd cycle, percent |
| Total $P_2O_5$ | 45.8 | 43.0 | 44.6 | 45.6 | 46.0 |
| Citrate insoluble $P_2O_5$ | 1.0 | 6.4 | 4.5 | 2.4 | 1.6 |
| Available $P_2O_5$ | 44.8 | 36.6 | 40.1 | 43.2 | 44.4 |
| Water soluble $P_2O_5$ | 42.0 | 30.2 | 22.4 | 16.3 | 6.2 |
| Availability | 98.0 | 85.2 | 90.0 | 94.6 | 96.5 |

As in Example I, most of the phosphate rock was converted into an available form and the final product contains essentially as high an available $P_2O_5$ content as the concentrated superphosphate itself. Again the water-soluble $P_2O_5$ content of the product has been lowered considerably due to conversion of the monocalcium phosphate to dicalcium phosphate and phosphoric acid which, in turn, reacted with the phosphate rock.

Since concentrated superphosphate is made with an acidulation of about 3.2 lbs. of 100% $H_3PO_4$ per pound of $P_2O_5$ from rock phosphate, the equivalent acidulation of the initial mixture can be calculated to be 1.67 lbs. of 100% $H_3PO_4$ per pound of $P_2O_5$ from rock phosphate which is equivalent to only 52% of that used in concentrated superphosphate manufacture.

*Example V*

A mixture was prepared containing 56.0 grams of the phosphate rock described in Example I, 37.8 grams of phosphoric acid (100% $H_3PO_4$ basis) and 19.2 grams of water. The mixture was allowed to cure at room temperature for several days. It was then placed in the hydrolysis flask, water was added to replace that lost by evaporation and the hydrolysis, conversion and grinding steps were carried through two cycles as in Example I. The composition of the initial mixture (before final addition of the water lost by evaporation) and of the 2 products are shown as follows:

| | Initial mixture, percent | Product | |
|---|---|---|---|
| | | 1st cycle, percent | 2nd cycle, percent |
| Total $P_2O_5$ | 46.8 | 48.8 | 49.5 |
| Citrate insoluble $P_2O_5$ | 6.1 | 3.6 | 1.0 |
| Available $P_2O_5$ | 40.7 | 45.2 | 48.5 |
| Water-soluble $P_2O_5$ | 37.5 | 31.0 | 26.0 |
| Availability | 87.0 | 92.6 | 98.0 |

The final product is comparable to the highest grade of commercial concentrated superphosphate with respect to total and available $P_2O_5$. The acidulation used was 2.0 lbs. of 100% $H_3PO_4$ per pound of $P_2O_5$ of phosphate rock which is only 62% of that normally used in concentrated superphosphate manufacture.

*Example VI*

A mixture of 100 grams of the phosphate rock of Example I, 55 grams of 100% phosphoric acid, and 34 grams of water was made and immediately subjected to hydrolysis under reflux for one hour and conversion without reflux for 30 minutes at 185° C. The product was ground to −60 mesh, 34 grams of water added, and the hydrolysis and conversion steps repeated. The composition of the products from each cycle is as follows:

| | 1st cycle | 2nd cycle |
|---|---|---|
| Total $P_2O_5$ | 47.9 | 49.1 |
| Citrate insoluble $P_2O_5$ | 6.7 | 2.3 |
| Available $P_2O_5$ | 41.2 | 46.8 |
| Water-soluble $P_2O_5$ | 18.6 | 14.2 |
| Availability | 86.0 | 95.3 |

The acidulation used was 1.63 lbs. of 100% $H_3PO_4$ per pound of $P_2O_5$ in the phosphate rock, or only 51% of that used for concentrated superphosphate production.

*Example VII*

A mixture was made of 100 grams of normal superphosphate, 14 grams of the phosphate rock used in Example I, and 40 grams of water. The normal superphosphate had been prepared in the laboratory by treating some of the same phosphate rock with 70% sulfuric acid in the proportions of 1.8 lbs. of 100% $H_2SO_4$ per pound of $P_2O_5$ and curing until the product contained 7% moisture. The mixture was subjected to 3 cycles of hydrolysis, conversion and grinding as in Example I. The composition of the normal superphosphate, the initial mixture of normal superphosphate and phosphate rock, and the product after each cycle are shown as follows:

|  | Normal super-phosphate | Initial mixture | Product | | |
|---|---|---|---|---|---|
|  |  |  | 1st cycle | 2nd cycle | 3rd cycle |
| Total $P_2O_5$ | 20.2 | 22.2 | 22.3 | 23.7 | 23.7 |
| Citrate insoluble $P_2O_5$ | 0.3 | 3.3 | 2.5 | 2.0 | 1.4 |
| Available $P_2O_5$ | 19.9 | 18.9 | 19.8 | 21.7 | 22.3 |
| Water-soluble $P_2O_5$ | 18.3 | 16.6 | 15.7 | 9.4 | 7.9 |
| Availability | 98.6 | 85.2 | 89.0 | 91.5 | 94.2 |

Less conversion per cycle is obtained when normal superphosphate or sulfuric acid is used, presumably due to the presence of the calcium sulfate which is formed. However, products of high total and available $P_2O_5$ content may be made by repeated cycles with a significant reduction in the acid requirement. In the above example, the equivalent acidulation of the initial mixture was 1.49 lbs. of 100% $H_2SO_4$ per pound of $P_2O_5$ as compared with 1.8 in commercial normal superphosphate manufacture; this is only 83% of the proportion of acid normally used.

It is clear that the process is not limited to batch operation as described in the above examples, but can be readily adapted to continuous operation, which is generally preferred in large scale manufacturing operations because of its economy. FIG. 1 indicates schematically how the process may be carried out continuously. Phosphate rock, water, and either acid or a monocalcium phosphate-containing material are continuously fed at a controlled rate into the first unit (mixer 10) and mixed. The mixture is then fed continuously into a hydrolysis unit (hydrolyzer 11) equipped for steam or other means of heating, a reflux condenser for return of evaporated water, agitation, and preferably grinding. The mixture is passed through the hydrolysis unit at such a rate as to provide the optimum degree of hydrolysis of the monocalcium phosphate to dicalcium phosphate and phosphoric acid.

The mixture is then fed into a conversion unit (converter 12) which is provided with high pressure steam or other means of heating to 130° C. at a rapid rate and for holding the mixture at this temperature or higher until an optimum degree of conversion has taken place. This unit is provided with outlets for removal of the heating medium. It is also provided for mixing and preferably grinding of the mixture.

The dry material from the conversion unit is ground (in grinder 13) and shipped for use or fed to subsequent hydrolysis, conversion, and grinding units for as many subsequent cycles as can be justified economically. It can also be partially recycled to hydrolyzer 11 as indicated by the dotted line in FIG. 1. In this case make-up water would be added to hydrolyzer 11.

The advantages of my new process can be listed as follows:

(1) Much less acid, in some cases less than one-half as much, is required to convert the $P_2O_5$ in phosphate rock to an available form than by other processes.

(2) The product is as high or higher in available $P_2O_5$ concentration than comparable present phosphate fertilizers.

(3) No curing is required in the process, whereas in many present processes several weeks of curing are required before the product can be used.

(4) The $P_2O_5$ content of the product may be either largely water-insoluble or partly water-insoluble and partly water-soluble, the relative proportions of the two forms being controllable by the proportion of monocalcium phosphate or acid used. For some fertilizer applications a product having most of its $P_2O_5$ water-insoluble is advantageous, while for others it is desirable to have some of the $P_2O_5$ in a water-soluble form.

(5) The physical condition of the product is excellent, since its moisture content and free acid content are very low, and it can therefore be stored in bags or in bulk without caking or deterioration of the bags.

While in the foregoing specification this invention has been described in relation to specific embodiments thereof and many of these embodiments have been set forth for purpose of illustration, it will be apparent to those skilled in the art that the invention is susceptible to other embodiments and that some of the details set forth herein can be varied considerably without departing from the basic concepts of the invention.

I claim:

1. The method of producing a phosphate fertilizer containing a substantial proportion of dicalcium phosphate in admixture with monocalcium phosphate, comprising forming an aqueous solution of monocalcium phosphate, heating said aqueous solution at a temperature above 50° C. but not over 120° C. to hydrolyze a substantial amount of the monocalcium phosphate to dicalcium phosphate with the liberation of phosphoric acid, the reaction mixture during said heating step containing from 5% to 50% free water to maintain in solution the monocalcium phosphate being hydrolyzed and to dissolve the phosphoric acid as it is liberated, and thereafter heating unreacted phosphate rock in intimate contact with aqueous phosphoric acid and dicalcium phosphate produced in said hydrolysis to evaporate the water and to promote the reaction of the phosphoric acid with the phosphate rock, thereby converting unreacted phosphate rock to monocalcium phosphate, said conversion heating step being carried out at atmospheric pressure at a temperature above 130° C. but below 260° C. and being continued with the evaporation of water from the reaction mixture until a substantially dry product is obtained containing a substantial proportion of dicalcium phosphate, said product containing the dicalcium phosphate formed in said hydrolysis in admixture with the monocalcium phosphate formed by said conversion.

2. In a method of producing a phosphate fertilizer containing a substantial proportion of dicalcium phosphate in admixture with monocalcium phosphate, the steps comprising mixing unreacted phosphate rock with an aqueous mineral acid selected from the group consisting of sulfuric acid and phosphoric acid, said acid being employed in an amount substantially less than the amount theoretically required to completely convert the $P_2O_5$ content of said rock to monocalcium phosphate, thereby obtaining a first material containing monocalcium phosphate and unreacted phosphate rock, mixing said first material with water to form a slurry, heating said slurry at a temperature above 50° C. but not over 120° C. to hydrolyze a substantial amount of the monocalcium phosphate to dicalcium phosphate with the liberation of phosphoric acid, said slurry during said heating step containing at least 5% free water but not over 30% free water so that the monocalcium phosphate being hydrolyzed is maintained in solution and the phosphoric acid as it is liberated is dissolved in said water, thereby obtaining a second material containing dicalcium phosphate, phosphoric acid, water, unreacted phosphate rock and a reduced amount of monocalcium phosphate, and thereafter heating said second material at atmospheric pressure and at a temperature above 130° C. but below 260° C. to evaporate the water and to promote the reaction of the phosphoric acid with unreacted phosphate rock, thereby converting at least a portion of the unreacted phosphate rock to monocalcium phosphate, said conversion heating step being continued until a substantially dry product is obtained, and said product containing as a substantial proportion thereof the dicalcium phosphate formed by said hydrolysis and the monocalcium phosphate formed by said conversion.

3. The process steps of claim 2 wherein a portion of a dicalcium and monocalcium phosphate-containing product produced as described in claim 2 is mixed with said first material prior to the completion of said hydrolyzing step, at least a portion of the monocalcium phosphate thus added to said slurry being dissolved in the aqueous phase thereof and being hydrolyzed to dicalcium phosphate during said hydrolysis step.

4. The method steps of claim 2 wherein said mineral acid is phosphoric acid.

5. The method of producing a phosphate fertilizer containing a substantial proportion of dicalcium phosphate in admixture with monocalcium phosphate, comprising forming a slurry having an aqueous phase and a solid phase, said solid phase containing unreacted phosphate rock and said aqueous phase containing dissolved monocalcium phosphate, heating said slurry to hydrolyze a substantial amount of the monocalcium phosphate to dicalcium phosphate with the liberation of phosphoric acid, said slurry being heated at a temperature within the range from 80 to 120° C., the said slurry during said hydrolysis containing from 5% to 30% free water to maintain in solution the monocalcium phosphate being hydrolyzed and to dissolve the phosphoric acid as it is liberated, thereby obtaining an intermediate reaction mixture containing dicalcium phosphate, aqueous phosphoric acid, unreacted phosphate rock and a reduced amount of monocalcium phosphate, and thereafter heating the intermediate reaction mixture thus obtained to evaporate the water and to promote the reaction of the phosphoric acid with the phosphate rock, thereby converting the phosphate rock to monocalcium phosphate, said conversion heating being carried out at a temperature above 150° C. but not substantially over 200° C. and being continued with the evaporation of water until a substantially dry product is obtained containing a substantial proportion of dicalcium phosphate in admixture with monocalcium phosphate, said product containing the dicalcium phosphate formed in said hydrolysis step and the monocalcium phosphate formed in said conversion step.

6. The process steps of claim 5 wherein a portion of a dicalcium and monocalcium phosphate-containing product produced as described in claim 5 is mixed with said first material prior to the completion of said hydrolyzing step, at least a portion of the monocalcium phosphate thus added to said slurry being dissolved in the aqueous phase thereof and being hydrolyzed to dicalcium phosphate during said hydrolysis step.

References Cited in the file of this patent

UNITED STATES PATENTS 2,567,227   Miller _____ Sept. 11, 1951